May 25, 1965  F. THEUERKAUF ETAL  3,184,856
MICROGAUGE

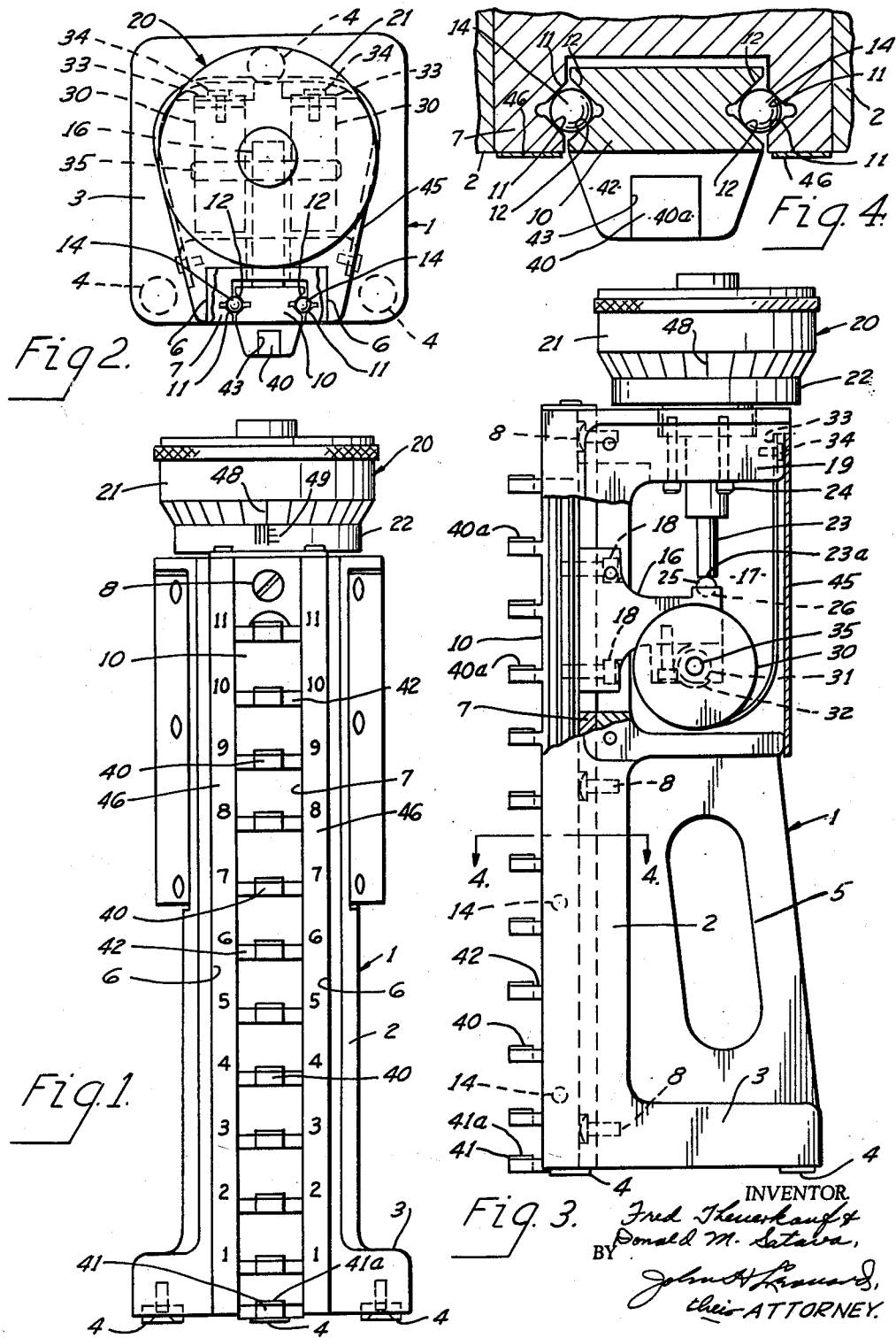

Filed May 1, 1962  3 Sheets-Sheet 2

INVENTOR.
Fred Theuerkauf
BY Donald M. Salava
John H. Leonard
their ATTORNEY.

INVENTOR.
Fred Theuerkauf &
Donald M. Sotara
BY
John H. Leonard,
their ATTORNEY.

United States Patent Office 3,184,856
Patented May 25, 1965

3,184,856
MICROGAUGE
Fred Theuerkauf, Mentor Township, and Donald M.
Satava, Wickliffe, Ohio, assignors to The Pipe Machinery
Company, Wickliffe, Ohio, a corporation of Ohio
Filed May 1, 1962, Ser. No. 191,577
8 Claims. (Cl. 33—169)

This invention relates to micrometer gauges and particularly to micrometer height gauges of the type to be supported in an upright position on a table top and having a plurality of vertically spaced steps, of which the upper surfaces are gauging faces precisely spaced predetermined distances apart from each other vertically.

Heretofore in such height gauges the practice has been to provide a body having on its under face precisely formed gauging surfaces adapted to engage the top of a table for supporting the body accurately in an upright position.

An earlier form of gauges of this type has a carrier in the form of an elongated member supported at its ends in bushings for movement endwise vertically and having steps at its forward upright face. The micrometer is carried by the body and arranged with its gauging spindle upright. The micrometer spindle is offset horizontally from the path of the carrier, so as not to interfere therewith, and cooperates with a rearwardly extending bracket on the carrier. However, in a gauge of this character, the reaction pressures against the micrometer spindle are offset transversely from the path of the carrier and, consequently, tend to cock the carrier slightly in its bushings. With the bushings heretofore employed, this introduces inaccuracies in the readings to such an extent that the gauges are not practical for extremely precise measurements now desired.

In order to eliminate such offset forces, a newer type of gauge was developed. In this later type, the carrier is an elongated rod which is turned and ground so as to provide annular steps, in the form of annular flanges, extending radially from the rod axis. The upper faces of these steps are finished so as to provide gauging faces.

In other instances the rod is cylindrical and fitted with a plurality of coaxial sleeves, each with a radial flange step arranged in like fashion. The advantage of these types of carrier are that they can be positioned coaxial with the micrometer spindle and thereby be freed from reactionary forces. These gauges are satisfactory for many purposes. However, should the gauging faces of one step become worn down or damaged so that it is not the precise proper distance from the others, the entire carrier must be discarded and a new carrier substituted. Even though the carriers are made of relatively soft metal so that such gauges can be made and sold to a large market, the cost of servicing is considerable.

In time it became necessary for greater accuracy to provide gauging faces of higher resistance to wear. This introduced the use of carbide for the gauging surfaces. But an entire carrier made of carbide is very expensive to manufacture, and the cost of replacing those worn or damaged greatly limits the marketability of the gauges in which they are used.

The attempt to offset this expense by providing the separate carbide sleeves, with radial flanges, stacked one on the other on a carrier has not been as satisfactory as desired. Such sleeves are expensive due to the large number of surfaces that have to be precisely finished and mated.

The need for a relatively inexpensive gauge of high precision such, for example, as one having an accuracy of at least plus or minus ½ a 10,000 of an inch, or 0.00005 inch, has become ever more desirable.

The principal object of the present invention is to provide a high precision gauge which can be made more economically than those heretofore existing.

Another object is to provide a gauge of which the carrier is arranged in offset relation to the spindle of the micrometer and yet is supported so as to maintain the precise position without rocking or cocking out of its normal lineal path of movement.

More specifically, the invention is directed to a height gauge in which the carrier is supported in the body for lineal movement by means of ball bearings in preloaded condition which permit free endwise movement of the carrier while preventing its rocking or cocking transversely of its path under the forces exerted for moving it lengthwise of its path and applied to a lug on the carrier offset laterally from the path of the carrier.

A more specific object is to provide a gauge with a carrier of this type of which the individual gauge surfaces are formed on separate blocks or inserts which can be removed from the carrier and individually replaced and lapped to precision in situ without replacing other blocks or refinishing their gauging surfaces, while retaining a true and accurate gauging relation between the surfaces of the original blocks and the one replaced.

More specifically the invention resides in the provision of a carrier adapted to be supported for vertical movement endwise and having a plurality of steps in each of which a block is detachably mounted and secured firmly in place, each block having a portion including at least the forming face formed of carbide, and the faces of all of the blocks being lapped to precision in situ on the carrier.

Various other objects and advantages will become apparent from the following description, wherein reference is made to the drawings which illustrate a preferred embodiment of the invention, and in which:

FIG. 1 is a front elevation of a height gauge embodying the principles of the present invention;

FIG. 2 is a top plan view of the gauge illustrated in FIG. 1;

FIG. 3 is a side elevation of the gauge illustrated in FIGS. 1 and 2, part thereof being shown in section for clearness in illustration;

FIG. 4 is a horizontal sectional view of a portion of the gauge illustrated in FIG. 3 and is taken on the line 4—4 thereof;

Figures 5, 6, 7:
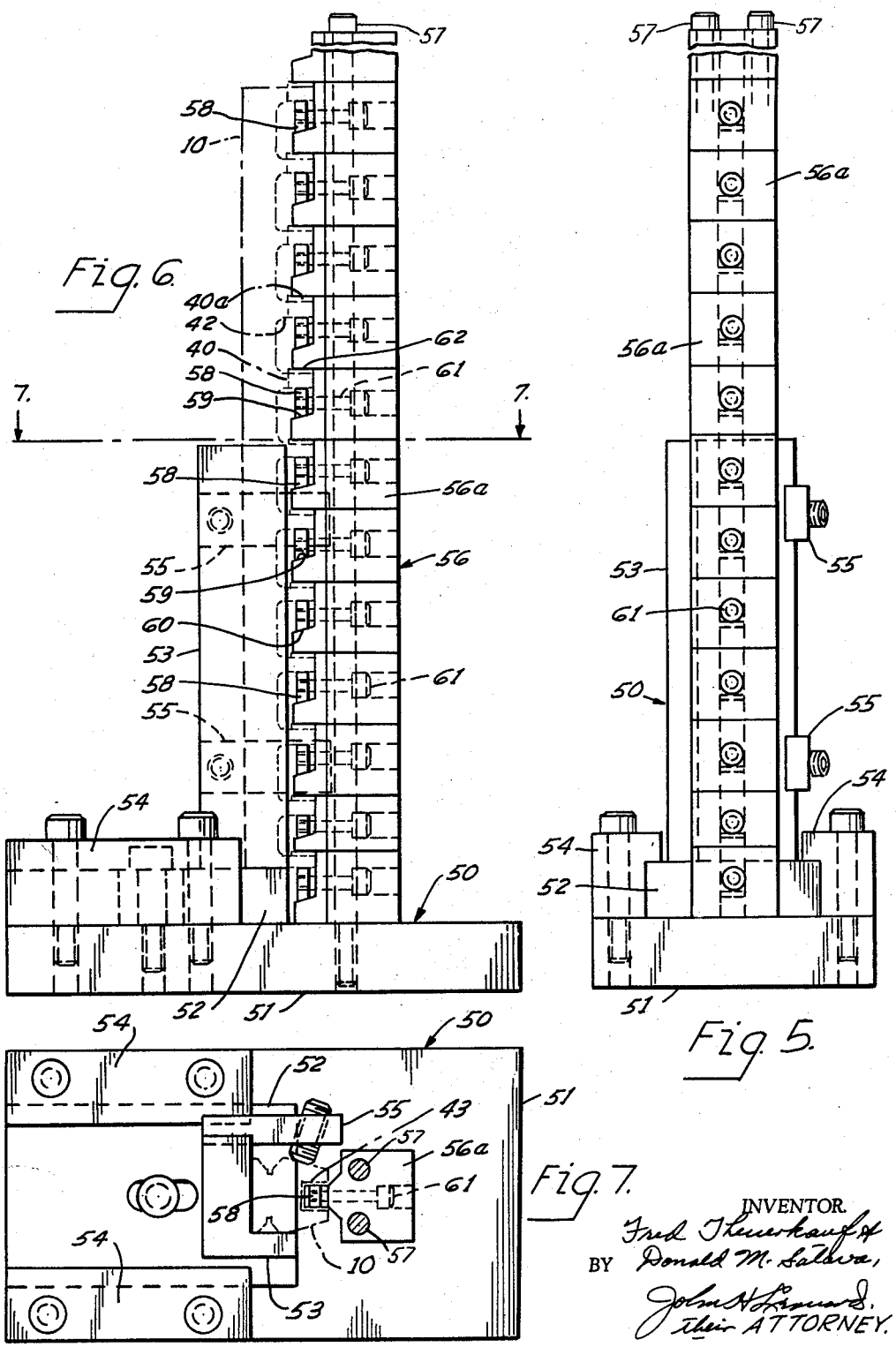
FIG. 5 is a front elevation of a jig used for assembling the gauging blocks in the gauge carrier.
FIG. 6 is a side elevation, partly in section, of the jig illustrated in FIG. 5.
FIG. 7 is a horizontal cross section of the jig taken on the line 7—7 of FIG. 6.

Referring to the drawings, the invention is described as embodied in a height gauge in which it is particularly advantageous, its use in other gauges, for example, a gauge adapted to be supported for horizontal gauging, being apparent from the illustrative example.

The gauge comprises a body 1 having an upright pedestal portion 2 and a horizontal base portion 3. The base portion 3 is provided at its under face with suitable gauge pads 4 having their bottom faces precisely finished and adapted for supporting the body precisely in an upright position on a horizontal top of a gauging table or the like. Preferably three pads 4 are used, so as to provide a three-point support assuring that the gauge body remains firmly in upright position. The body may be provided with a hand grip portion 5 for convenience in handling.

The pedestal 2 is provided with a forwardly open channel 6 in which is mounted a forwardly open lineal upright guideway 7. The guideway 7 is preferably a channel of hardened material. It fits firmly in the channel 6 of the pedestal and is secured fixedly in place by suitable bolts 8. An elongated gauging carrier 10 is mounted in the guideway 7 for lineal endwise movement. For mounting the carrier in the guideway 7 for lineal movement precisely in upright position and free from cocking, the guideway 7 is provided with guide surfaces 11 which face generally inwardly laterally toward the sides of the carrier 10. The carrier 10 is provided with complementary guide surfaces 12 which face outwardly transversely of the carrier generally toward the surfaces 11. The carrier 10 is antifrictionally supported in spaced relation to the bottom wall and side walls of the guideway 7 by ball bearings or other suitable rollers 14.

In order to constrain the carrier 10 from cocking or rocking forwardly and rearwardly or transversely of the guideway 7, the surfaces 11 in the inner side walls of the guideway 7 are angularly disposed to each other, preferably at an angle of 90°. Each of the corresponding guide surfaces 12 on the carrier 10 is arranged preferably in parallelism with the one of the surfaces 11 directly facing it. The angular arrangement is such that the bisector of the angle of the two intersecting surfaces 11 and intersecting surfaces 12 lie in a common plane extending vertically and transversely of the carrier.

The balls are installed between the surfaces 11 and 12 in preloaded condition. As a result, the balls and guide surfaces coact to prevent forward and rearward displacement of the carrier, as well as rocking or cocking in the guideways. Due to the preloaded condition the balls support the carrier for vertical movement precisely in an upright lineal path at all times.

In order to operate the carrier and prevent interference of the micrometer therewith, the carrier 10 is provided with a rearwardly extending lug 16. The upper part of the body 1 has a concavity 17 in which the lug is accommodated for vertical movement without interference. If desired, the lug can be made as a piece separate from the carrier and secured thereto by suitable bolts 18.

The body is provided with a top platform 19 on which a micrometer 20 is fastened. The micrometer 20 has a thimble 21, barrel 22 and spindle 23. It is arranged with its screw and spindle vertical and with the spindle 21 in offset relation to the path of the carrier 10.

The micrometer is secured to the platform 19 of the body by suitable means, such as bolts 24, in a position such that the spindle 21 of the micrometer extends into the concavity 17. The lower end of the spindle, indicated at 23a, engages a suitable ball bearing 25 which is fixedly mounted in the top of the lug 16. Preferably this is done by providing a socket 26 in the lug and cementing the ball bearing 25 therein. If desired, the spindle may be connected to the lug 16, instead of merely bearing firmly on the ball bearing 25.

In order to counterbalance the carrier and lug to urge the carrier upwardly in its guideway in the body and juxtapose the ball bearing 25 firmly in proper gauging pressure against the anvil end surface of the spindle 23, suitable resilient counterbalancing means are provided. In the form illustrated, the counterbalancing means comprise a pair of constant strength springs 30. These springs are of the spiral clock-spring type. Each is wound on a spool 31 and has one end 32 connected to the hub of the spool for rotation therewith and the other end 33 connected to the platform 19 in fixed position by means of a bolt 34. Preferably two such springs are employed, one on each side of the lug 16. The spools are arranged on a common shaft 35 extending horizontally and transversely of the path of the carrier 10. The springs are of sufficient strength to lift the carrier to its fully raised position when it is unopposed by the spindle 23 and yet permit downward movement of the carrier by the micrometer spindle without imposing an appreciable wearing load on the micrometer screw and its operating parts.

The micrometer may be of a conventional type that can be purchased on the market, and preferably is of the type having a non-rotatable spindle.

For gauging purposes, the carrier 10 is provided at its forward face with a plurality of gauging blocks 40. These blocks are arranged in a row in spaced relation in direct alignment endwise of the carrier and their upper faces 40a are spaced a precise distance from each other. Preferably the spacing is exactly one inch for all of the blocks, except the bottom block 41. The upper face 41a of the bottom block is spaced preferably precisely one-quarter of an inch above the under surface of the pads 4 when the carrier is in its lowermost position so as to gauge things from one-quarter of an inch in height upwardly.

The gauge body and carrier may be of any suitable steel or other metal depending upon the quality desired with respect to expansion, corrosion, and the like. However, the gauging blocks 40 must be of very hard wear resisting material, preferably carbide, or at least must have their upper portions including the faces 40a formed of carbide or equivalent material.

As mentioned, it is desirable that any block be readily removable and replaceable without having to replace the entire carrier or the other blocks. For this purpose the carrier is provided with a plurality of steps 42 which extend forwardly of the body 1 through the open forward side of the guideway 7. These steps are spaced approximately the same distance apart as the gauging faces 40a and each step is provided with a forwardly opening notch 43. The blocks 40 are received in the notches 43 and cemented in place, preferably with a hydroxy resin. When high precision is required, the blocks are not lapped and then installed in the notches, but are rough ground, inserted and cemented firmly in place and then lapped in situ.

Accordingly, the steps 42 support the blocks 40 forwardly of the forward face of the carrier in a position where they can be reached readily for lapping in situ.

In order to protect the working parts in the upper part of the body 1, a suitable cover 45 may be provided. Marking strips 46 reading to the nearest inch may be provided on the front of the gauge. The micrometer spindle may be provided with a graduated scale 48 reading, for example, the closest 0.0001 of an inch, and the barrel of the micrometer may be provided with a lineal vernier scale 49, enabling the micrometer to be adjusted to the closest 0.00001 of an inch.

It is desirable for economy in assembling a new gauge that the blocks 40 be held in a suitable jig accurately in position in spaced relation to each other during their initial installation in the notches 43 and while the cement is setting. For this purpose a jig 50, such as illustrated in FIGS. 5 and 6, is employed. The jig comprises a main base 51 on which a supporting slide 52 carrying an upright support 53 is mounted in suitable slideways 54. The slideways 54 support the slide 52 for movement horizontally in a lineal path. The support 53 is in the form of a forwardly open channel which is adapted to receive the carrier 10 in upright position with its step 42 facing forwardly of the support. The support is provided with carrier clamps 55 by which the carrier 10 can be clamped fixedly in upright position for movement forwardly and rearwardly horizontally with the support 53 while in upright position by movement of the slide 52.

Mounted on the base 51 in upright position directly in the path of and facing toward the support 53 is a holder 56 which supports and holds the gauging blocks 40 in position for installation in the notches of the steps and cementing in place.

If desired, the support 56 may comprise a stack of individual gauge blocks 56a which are secured together in properly stacked position by means of vertical bolt rods 57. Each of the blocks 56a is provided with a clamping jaw 58 having a sloping wedge surface 59 on its underface cooperating with the corresponding complementary wedge surface 60 on the associated block 56a. A screw 61 is mounted for rotation in each block 56a and is in threaded engagement with the clamping jaw 58 thereof. The screw 61 is operative, upon rotation, to move the clamping jaw 58 along the wedge surface 60. When so moved, the upper surface of the jaw 58 engages the under surface of one of the gauge blocks 40 to be installed in the microgauge carrier and forces it firmly against the undersurface 62 of the next one of the blocks 56a above the block 56a in which the particular gauging block 40 is being clamped. The surfaces 62 are precise distances apart and, consequently, when the blocks 40 are clamped in their respective blocks 56a, their upper surfaces 40a are spaced apart very accurately. In fact, the faces 40a are sufficiently accurate for rather precise gauging. With the blocks 40 clamped in this position, the carrier 10 is installed in the vertical support 53 and clamped precisely in position. In this condition, the slide 52 is moved toward the upright support 56 until the blocks 40 carried by the support 56 are received in the notches 43 of the carrier 10. The cement may be applied on the walls of the notches 43 and on the blocks 40 at the time the blocks are thus moved into place. This relation is maintained until the cement sets, after which the clamping jaws 58 are released and the upright support 53 with the carriage 10 is moved back away from the support 56. The blocks 40 are thus installed in the carrier 10 and this installation is precise enough for a large number of uses, having an accuracy, for example, of 0.0002 of an inch.

After the cement is set, the carrier 10 is installed in position in the gauge body 2, and adjusted accurately to position. Usually this is done by gauging the individual blocks and selecting the one of which the top gauging surface is nearest to its proper final distance from the top of a gauge table on which the gauge rests. For example, disregarding the bottom block 40, the upper face 40a of the block 40 on the fifth step from the bottom should be exactly five inches above the table surface; that on the sixth step should be exactly six inches above the table surface, and so on. After measurements have been taken, and the block 40 having its upper surface 40a closest to its final proper height is selected for starting, the surface 40a of the selected block is then lapped precisely to the proper height. By proceeding in this manner one is assured that there will be an upper surface stratum for removal on each of the other blocks 40 of which the upper surfaces were farther away from the table top in relation to their final proper height than that of the one selected. Having lapped this particular starting block, then the micrometer can be adjusted and zeroed for the exact height for the upper face 40a of that particular block. Thereafter, each of the other blocks can be lapped by moving them to their required height by the micrometer itself. For example, each block may be lowered slightly below the position of lapping. Then, when the lapping tool is moved into the precise position, the micrometer can be operated to lift the block 40 as required for assuring lapping to the proper height. Successive movements of the micrometer control exactly the amount to be lapped in each operation and also will indicate when the upper face of the block is exactly the proper height.

Figure 8:
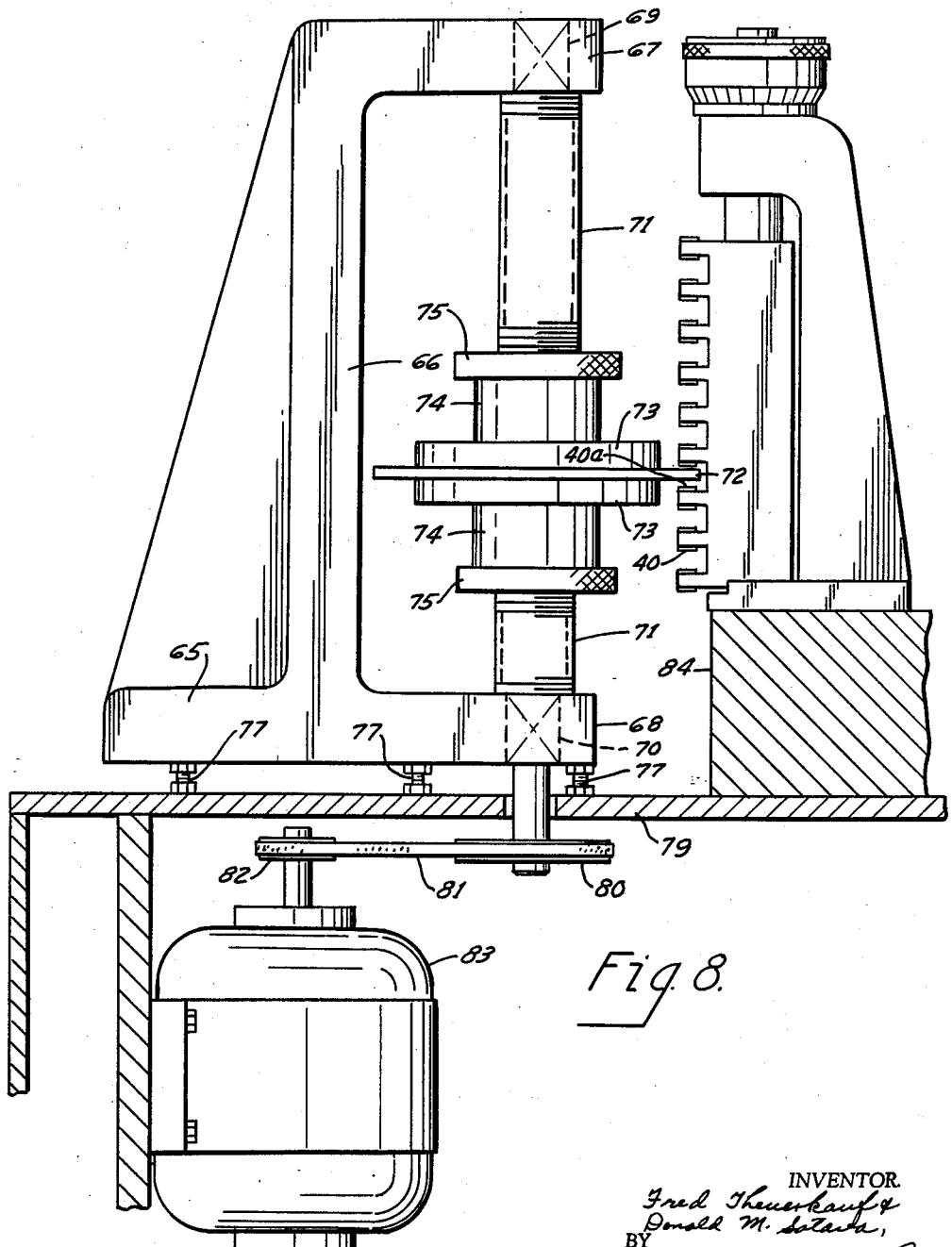
FIG. 8 is a side elevation of the gauge illustrated in FIG. 1, a lapping fixture for use in connection therewith for lapping the gauge faces to precision with respect to each other in situ.

The lapping may be done in numerous ways. A device for this purpose is illustrated in FIG. 8. The lapping device comprises a base 65 having an upright portion 66 with top and bottom platforms 67 and 68 which accommodate coaxial precision bearings 69 and 70, respectively. Rotatably mounted in the bearings 67 and 68 with its axis precisely in upright position is a threaded arbor 71 on which is mounted a lapping disc 72. The lapping disc is clamped on and in coaxial relation with the threaded arbor for rotation therewith by means of clamping plates 73, collars 74, and height adjusting lock nuts 75. The thread on the arbor is of relatively fine pitch so that precise adjustment of the disc vertically can be effected by rotating the disc and clamping it firmly in the selected position by the nuts 75. The base 65 is provided with three adjustable leveling screws 77 which are adapted to support the base 68 in properly levelled position on the top of a gauge table 79.

The arbor 71 is rotatably driven through a pulley 80, belt 81, and pulley 82 by a variable speed motor 83. A suitable surface plate 84 is mounted on the work table and supports the microgauge 1 of which the surfaces 40a are to be lapped in situ. The height of the upper surface of the first block to be lapped is carefully checked by a master gauge, whereupon lapping is commenced by raising the block against the under side of the lapping disc 72 by operation of the micrometer on the microgauge.

The disc 72 may be of cast iron and employ a lapping compound of which the abrasive is diamond dust. For preliminary lapping the diamond dust may have a particle size of from about 8 to 22 microns, and for finished lapping from 1 to 4 microns. Other types of lapping devices may be provided. However, the important feature is that the upper faces 40a of the blocks 40 are lapped in situ.

Generally, the gauges may be made with an accuracy of 0.00005 inch, the accuracy of course depending to some extent upon the precision required or the work in connection with which the gauge is to be used.

The upper surfaces 40a of the blocks 40 are installed in the carrier 10 with a precision of 0.0002 inch without lapping, so that the gauge is useful for some applications without lapping.

It is apparent from the foregoing that the gauge can be manufactured relatively inexpensively inasmuch as all parts except the gauge blocks 40 themselves are parts which are of relatively soft and easily workable metals and can be machined or formed readily. On the other hand, the blocks 40, or at least the gauging faces 40a, are carbide and withstand wear for appreciable periods.

If any step does become damaged by accident, or worn, as by corrosion, erosion, and the like, or even by bending of the step, the gauge can be readily brought back to precision by straightening the step that is bent, removing the old block by dissolving the cement, cementing a new block 40 in place in the carrier with enough material allowance for lapping, and lapping the upper face 40a of the inserted block to the precise one inch distance or preselected distance from the upper face of the adjacent blocks above and therebelow it, respectively.

Furthermore, due to the preloading of the ball bearings, it is possible to make a gauge with the micrometer offset from the carrier without any danger of cocking or binding of the carrier in the guideway. As a result, it is not necessary for the carrier to be movable along a path which lies along the axis, or substantially at the axis, of the micrometer spindle.

It is apparent from the foregoing description that the gauge herein is much less expensive to manufacture than those using carbide carriers with integral gauging faces, and multiple carbide sleeves in rows, as heretofore described.

Having thus described our invention, we claim:

1. A multi-step height microgauge comprising a gauge body, an elongated carrier, preloaded rollable antifriction bearing means supporting the carrier on the body for lineal movement relative to the body endwise of the carrier along an upright fixed path, a plurality of permanent steps on the carrier and projecting laterally from one upright face thereof in spaced relation to each other in an upright row extending endwise of the carrier, gauge blocks detachably bonded to the steps, respectively, with a bonding material of which the bond can be destroyed, and thereby permit removal and replacement of a block at a temperature below that which can affect the precise dimensions and shape of the carrier and its mounting, each gauge block having an upwardly facing gauging face disposed above the level of the adjacent face of its associated step, said gauging faces being precisely spaced predetermined distances from each other, means including a micrometer for causing movement of the carrier endwise to position said faces at precisely measured positions endwise relative to the body, and said body having a base with supporting gauging surface means thereon facing endwise of the carrier away from the carrier and operable to support the body on a horizontal surface with the carrier in upright position.

2. A structure according to claim 1 wherein the bonding material is a settable cement.

3. A structure according to claim 2 wherein the cement is a synthetic organic material which, in unheated condition, is originally plastic and is settable chemically while it remains in unheated condition.

4. A structure according to claim 1 wherein the bonding material is hydroxy resin.

5. The method of manufacturing an upright multi-step microgauge including a body and elongated carrier, preloaded rollable, antifriction bearing means supporting the carrier on the body for lineal movement endwise of the carrier relative to the body along an upright path, said method comprising providing an elongated carrier with a plurality of steps thereon projecting laterally thereof and arranged in a row endwise of the carrier in substantially equally spaced relation endwise thereof from each other, machining the carrier to a final precise finish, assembling a plurality of metal blocks, corresponding to the number of steps, in a holding jig with their upper faces precisely spaced each a predetermined distance from those adjacent to it, then, while so holding the blocks, moving the carrier to a position so that the blocks held by the jig are in final position with respect to the steps, respectively, holding the carrier precisely in said position, concurrently, and while the carrier and blocks are so held, cementing the blocks to the steps, respectively, each with its upper surface slightly above the adjacent surface of its associated step, causing the cementitious material to set while the blocks and carrier are so positioned, providing a finished guideway in the body, mounting the carrier in final operating position in the guideway, and while the carrier is so mounted, lapping the upwardly facing surfaces of the blocks to precisely equal spacing relative to each other.

6. The structure according to claim 1 wherein each step has a notch therein extending therethrough endwise of said row and open forwardly outwardly from said face, and the associated block is cemented in fixed position in the notch.

7. The structure according to claim 1 wherein at least one portion of each block, including the gauging face, is carbide.

8. The structure according to claim 1 wherein the gauging faces are lapped in situ.

References Cited by the Examiner

UNITED STATES PATENTS 2,819,530   1/58   Webber _____ 33—169
2,953,855   9/60   Rodwell _____ 33—170

FOREIGN PATENTS 811,754   4/37   France.

OTHER REFERENCES

"Tool and Die Journal," September 1947, page 35.
"Tooling and Production," May 1958, page 53.
Mankonen: "The Neg'ator in Instrumentation" ISA Journal, September 1952, pages 115–119.

ISAAC LISANN, *Primary Examiner.*

ROBERT B. HULL, *Examiner.*